United States Patent
Ise

(10) Patent No.: US 10,587,811 B2
(45) Date of Patent: Mar. 10, 2020

(54) DISPLAY CONTROL APPARATUS AND CONTROL METHOD FOR THE SAME

(71) Applicant: CANON KABUSHIKI KAISHA, Tokyo (JP)

(72) Inventor: Toshimichi Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/212,766

(22) Filed: Dec. 7, 2018

(65) Prior Publication Data
US 2019/0182432 A1    Jun. 13, 2019

(30) Foreign Application Priority Data

Dec. 13, 2017  (JP) ................................. 2017-238917

(51) Int. Cl.
| | | |
|---|---|---|
| *H04N 5/232* | (2006.01) | |
| *H04N 9/04* | (2006.01) | |

(52) U.S. Cl.
CPC . *H04N 5/232945* (2018.08); *H04N 5/232122* (2018.08); *H04N 5/232127* (2018.08); *H04N 5/232935* (2018.08); *H04N 9/045* (2013.01)

(58) Field of Classification Search
CPC ....... H04N 5/232945; H04N 5/232935; H04N 5/232127; H04N 5/232122; H04N 9/045
See application file for complete search history.

(56) References Cited

U.S. PATENT DOCUMENTS

| | | | | |
|---|---|---|---|---|
| 7,978,236 B2* | 7/2011 | Takahara | ............... | G03B 13/10 |
| | | | | 348/240.99 |
| 10,044,943 B2* | 8/2018 | Saito | .................... | H04N 5/2628 |
| 2009/0185064 A1* | 7/2009 | Maniwa | ............. | H04N 5/23212 |
| | | | | 348/333.11 |
| 2011/0248942 A1* | 10/2011 | Yana | .................. | H04N 5/23212 |
| | | | | 345/173 |
| 2012/0249598 A1* | 10/2012 | Fukushima | ........... | G06F 3/0362 |
| | | | | 345/660 |

FOREIGN PATENT DOCUMENTS

| | | |
|---|---|---|
| JP | 2008-211630 A | 9/2008 |
| JP | 2016-197180 A | 11/2016 |

* cited by examiner

*Primary Examiner* — Luong T Nguyen
(74) *Attorney, Agent, or Firm* — Cowan, Liebowitz & Latman, P.C.

(57) ABSTRACT

A display control apparatus: displays an enlarged image of an enlarging area including a first focus measurement area and a focus guide corresponding to the first focus measurement area; moves the enlarging area in the captured image, in response to a moving instruction from a user that does not satisfy a predetermined condition, and displays an enlarged image of an enlarging area whose position was changed by the moving instruction and a focus guide that corresponds to the first focus measurement area; and newly sets, in response to a moving instruction from a user that satisfies the predetermined condition, a second focus measurement area in a predetermined area of an enlarging area whose position was changed by the moving instruction, and displays an enlarged image of the enlarging area and a focus guide that corresponds to the second focus measurement area.

18 Claims, 12 Drawing Sheets

FIG. 2A

NON-IMAGE CAPTURE SURFACE PHASE DIFFERENCE
METHOD PIXEL CONFIGURATION

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

IMAGE CAPTURE SURFACE PHASE DIFFERENCE METHOD
PIXEL CONFIGURATION

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

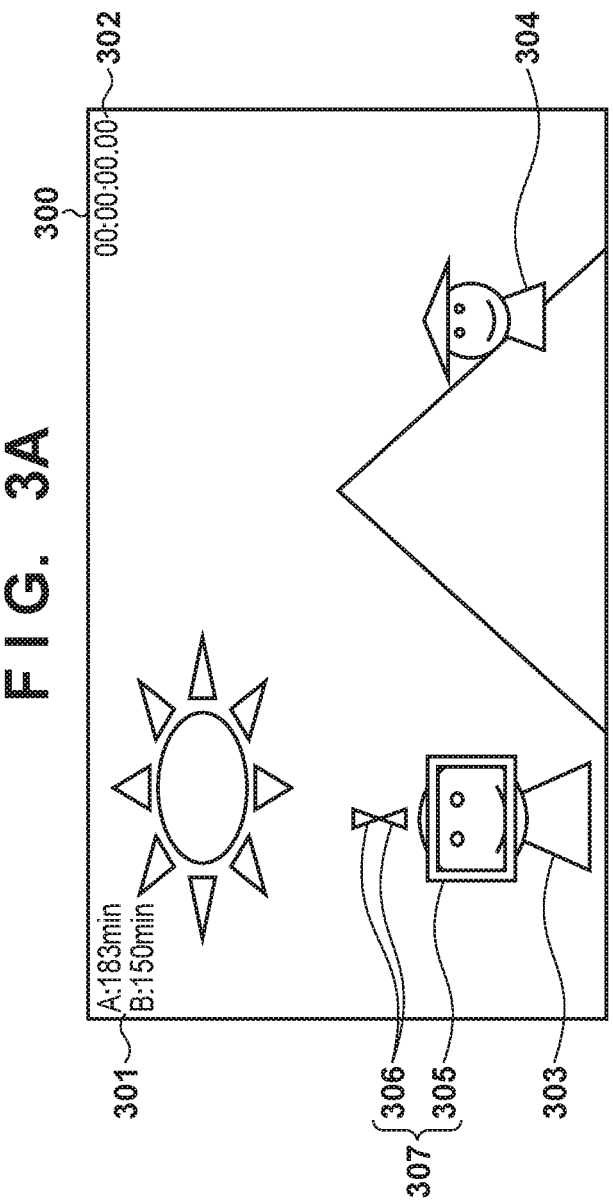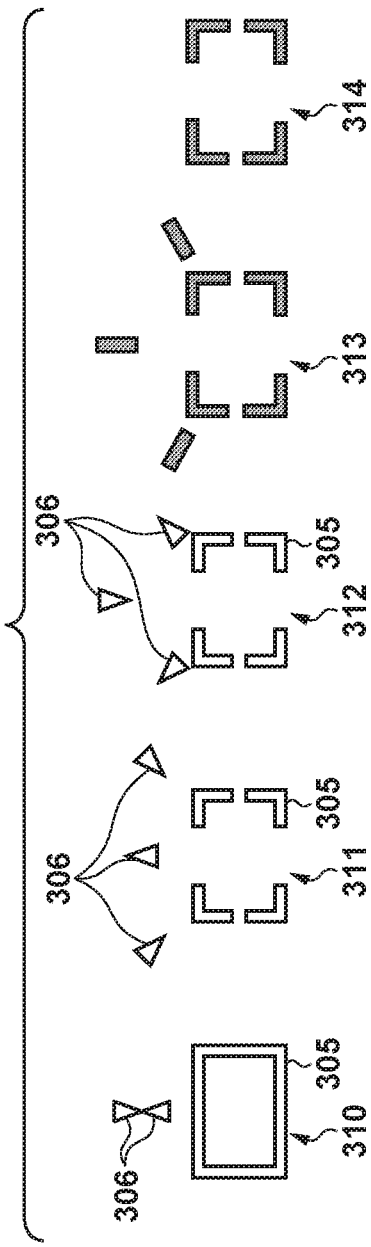

F I G. 4A
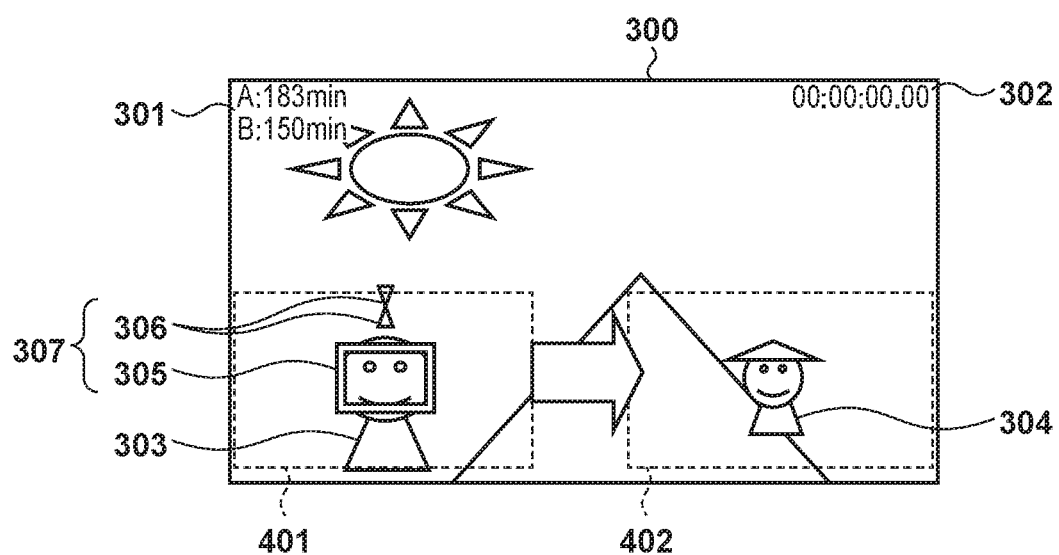

FIG. 5
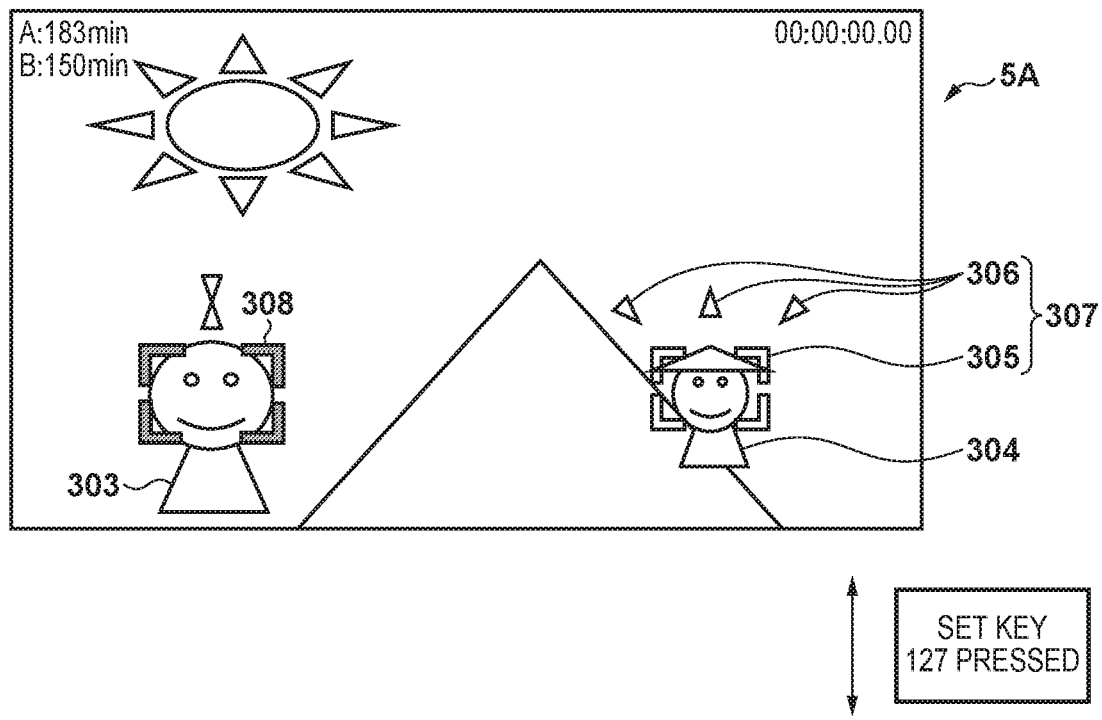
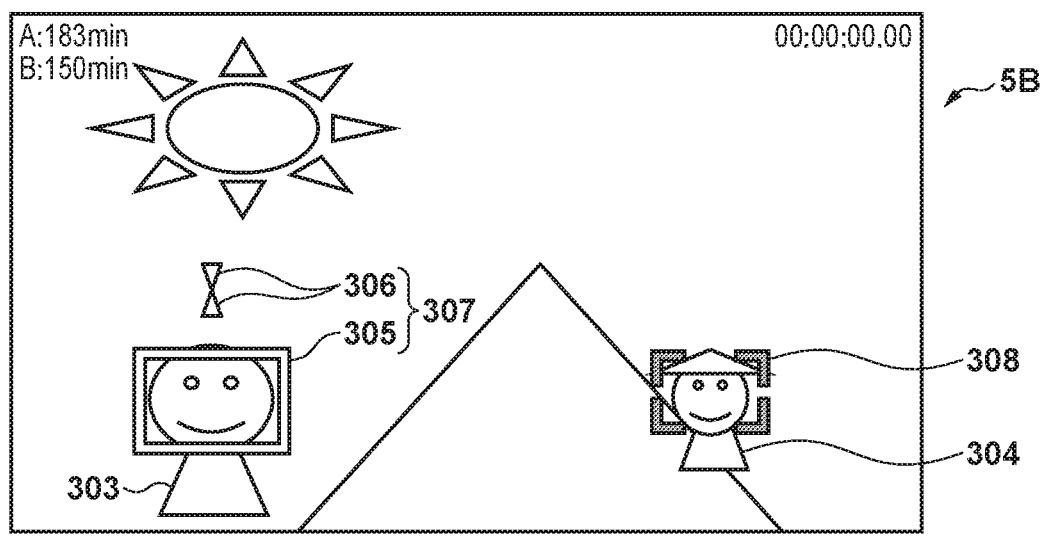

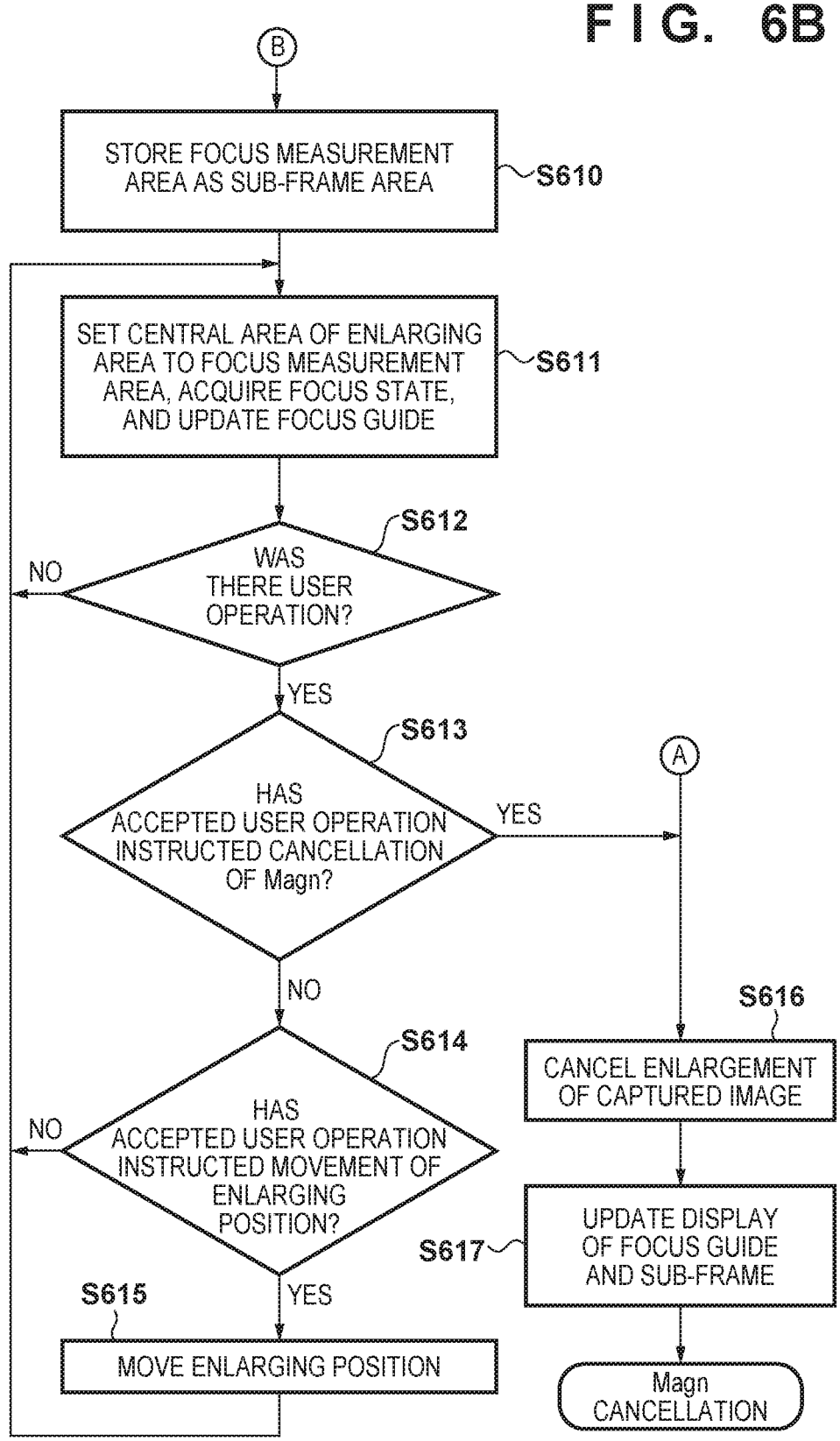

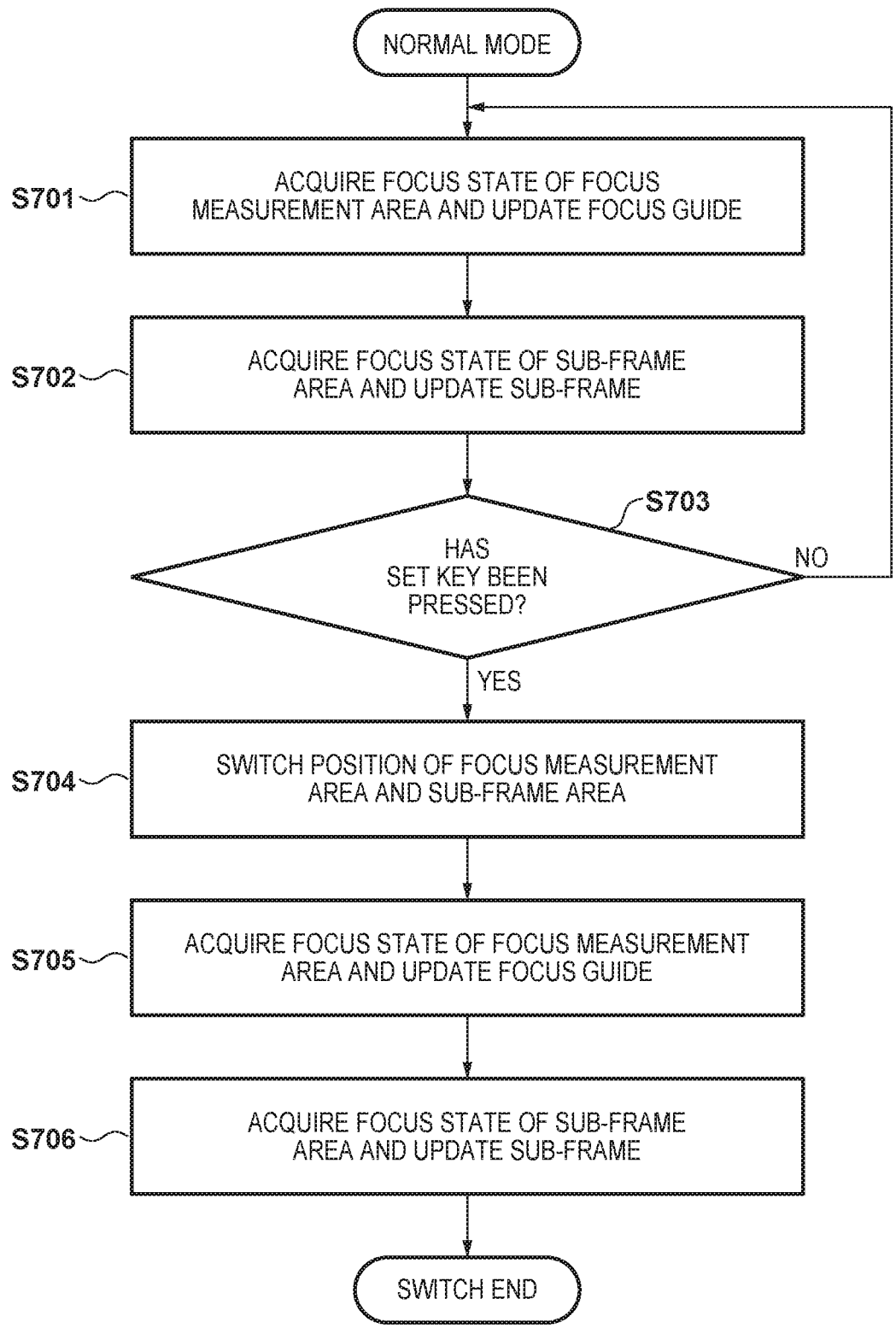

DISPLAY CONTROL APPARATUS AND CONTROL METHOD FOR THE SAME

BACKGROUND OF THE INVENTION

Field of the Invention

The present invention relates to a display control apparatus and a control method for the same, and more particularly to a display technology for focus-related information.

Description of the Related Art

There is a problem with recent video cameras in that it is difficult to focus with the viewfinder (VF) or small attached monitor at the time of shooting in high resolution such as 4K shooting or 8K shooting. In order to solve that problem, there is a function of displaying a guide relating to focusing in a designated area, for example (Japanese Patent Laid-Open No. 2016-197180 (hereinafter, Document 1)). There is also a function of enlarging the captured image of a designated area to assist focusing, and there also exists a focusing function of coordinating the operations of the camera with that function (Japanese Patent Laid-Open No. 2008-211630 (hereinafter, Document 2)).

According to Document 1, when enlargement of an image is instructed, the image is displayed after being enlarged centering on a distance-measuring position. In Document 2, when a focus area within an enlarged image is moved, the area of enlarged display moves so that an enlarged image centering on the focus area is always displayed. However, in Document 1 and Document 2, the enlarging area moves in tandem with movement of a focus detection area in the captured image. Thus, the enlarging area cannot be changed to view the surrounding situation with the place for checking the focus state fixed on a specific object. Furthermore, it is also conceivable that after changing the enlarging area with the place for checking the focus state fixed on a specific object, the user might want to change the place for checking the focus state.

SUMMARY OF THE INVENTION

In one embodiment of the present invention, a display control apparatus capable of more favorably changing an enlarging area and setting a focus measurement area at the time of enlarged display, a control method for the display control apparatus, a computer program and a memory medium are provided.

According to one aspect of the present invention, there is provided a display control apparatus comprising: a memory; and at least one processor and/or at least one circuit to perform the operations of the following units: an enlargement unit configured to generate an enlarged image obtained by enlarging an enlarging area of a captured image; a moving unit configured to move the enlarging area according to a moving instruction from a user; and a control unit configured to display the enlarged image generated by the enlargement unit on a display unit, wherein the control unit executes: first display processing for displaying, on the display unit, an enlarged image of an enlarging area that includes a first focus measurement area and a focus guide that corresponds to the first focus measurement area, second display processing for, in response to the moving instruction and if the moving instruction does not satisfy a predetermined condition, displaying, on the display unit, an enlarged image of an enlarging area whose position was changed by the moving instruction and a focus guide that corresponds to the first focus measurement area, and third display processing for, in response to the moving instruction and if the moving instruction satisfies the predetermined condition, newly setting a second focus measurement area in a predetermined area of an enlarging area whose position was changed by the moving instruction, and displaying, on the display unit, an enlarged image of the enlarging area and a focus guide that corresponds to the second focus measurement area.

According to another aspect of the present invention, there is provided a control method for a display control apparatus, comprising: displaying, on a display unit, an enlarged image of an enlarging area, which is in a captured image, that includes a first focus measurement area and a focus guide that corresponds to the first focus measurement area; moving the enlarging area in the captured image, in response to a moving instruction from a user that does not satisfy a predetermined condition, and displaying, on the display unit, an enlarged image of an enlarging area whose position was changed by the moving instruction and a focus guide that corresponds to the first focus measurement area; and newly setting, in response to a moving instruction from a user that satisfies the predetermined condition, a second focus measurement area in a predetermined area of an enlarging area whose position was changed by the moving instruction, and displaying, on the display unit, an enlarged image of the enlarging area and a focus guide that corresponds to the second focus measurement area.

According to another aspect of the present invention, there is provided a non-transitory computer-readable storage medium storing a computer program for causing a computer to execute a control method for a display control apparatus, the control method comprising: displaying, on a display unit, an enlarged image of an enlarging area, which is in a captured image, that includes a first focus measurement area and a focus guide that corresponds to the first focus measurement area; moving the enlarging area in the captured image, in response to a moving instruction from a user that does not satisfy a predetermined condition, and displaying, on the display unit, an enlarged image of an enlarging area whose position was changed by the moving instruction and a focus guide that corresponds to the first focus measurement area; and newly setting, in response to a moving instruction from a user that satisfies the predetermined condition, a second focus measurement area in a predetermined area of an enlarging area whose position was changed by the moving instruction, and displaying, on the display unit, an enlarged image of the enlarging area and a focus guide that corresponds to the second focus measurement area.

Further features of the present invention will become apparent from the following description of exemplary embodiments with reference to the attached drawings.

BRIEF DESCRIPTION OF THE DRAWINGS

FIGS. 2A and 2B are diagrams illustrating a light-receiving surface of an image capture device 102.

FIGS. 3A and 3B are diagrams showing examples of a screen and guide displays that indicate a focus state.

FIGS. 4A, 4B, and 4C are diagrams showing examples of screens when an operation is performed after enlarged display according to a first embodiment.

FIG. 5 is a diagram showing an example of a screen after canceling enlarged display according to the first embodiment.

FIGS. 6A and 6B are flowcharts showing processing at the time of enlarged display according to the first embodiment.

FIG. 7 is a flowchart showing processing of display guide switching according to the first embodiment.

DESCRIPTION OF THE EMBODIMENTS

Hereinafter, embodiments of the present invention will be described with reference to the accompanying drawings.

First Embodiment

Hardware Configuration

Figure 1:
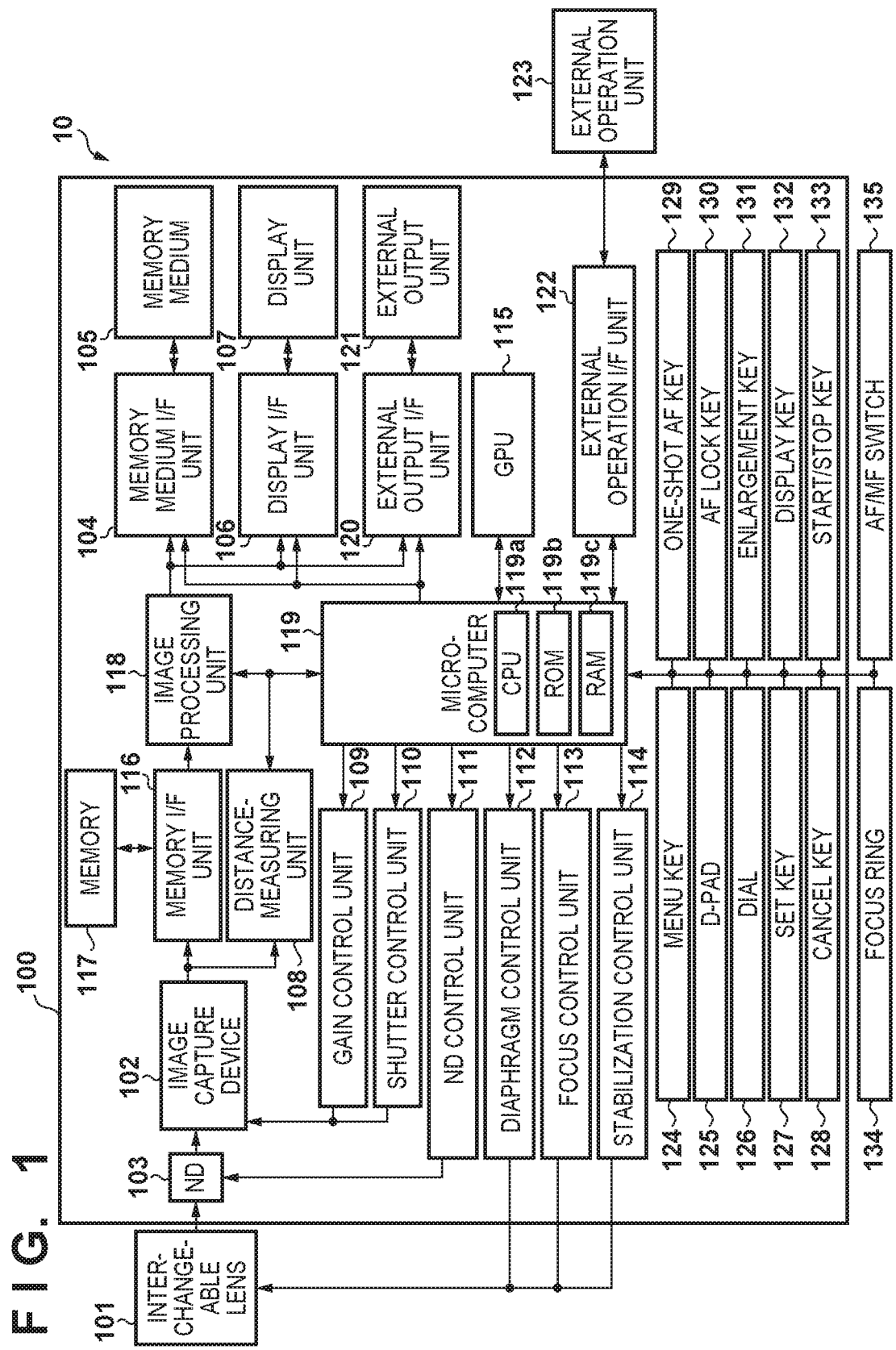
FIG. 1 is a block diagram showing an exemplary configuration of a digital camera 10.

FIG. 1 shows an example of the hardware configuration of a digital camera 10 serving as an example of a display control apparatus of a first embodiment. In FIG. 1, a casing 100 is an external covering that contains many of the constituent elements of the digital camera 10. Various types of operation units (124 to 135), a display unit 107 and an external output unit 121 are exposed on the surface of the casing 100. An interchangeable lens 101 is a taking lens that consists of a plurality of lens groups, and includes a diaphragm in addition to being provided internally with a focus lens, a zoom lens, and a shift lens.

An image capture device 102 has a configuration in which a plurality of pixels each having a photoelectric conversion element are arrayed two-dimensionally. The image capture device 102 performs photoelectric conversion with the pixels on an object optical image formed by the interchangeable lens 101, and further performs analog-to-digital conversion using an A/D conversion circuit and outputs image signals (RAW image data) in units of pixels. A distance-measuring unit 108 calculates information such as a defocus amount and various types of reliability based on output signals from the image capture device 102. Note that the image capture device 102 and the associated distance-measuring unit 108 will be described in detail later with reference to FIGS. 2A and 2B. An ND filter 103 adjusts the amount of incident light separately to the diaphragm provided in the lens.

An image processing unit 118 corrects level differences originating in the image capture device 102. For example, the image processing unit 118 corrects the level of pixels in an effective area, using pixels in an OB area (optical black area). Also, the image processing unit 118 performs various processing such as correction using pixels neighboring a defective pixel, correction for a decrease in the amount of peripheral light, color correction, edge enhancement, noise reduction, gamma correction, debayering and compression. The image processing unit 118 outputs corrected image data to other control units when the above processing is performed on RAW image data input from the image capture device 102.

A memory medium I/F unit 104 is an interface between a memory medium 105 and the digital camera 10, and controls recording of image data input from the image processing unit 118 and reading out of recorded image data with respect to the memory medium 105. The memory medium 105 is a memory medium that is constituted by a semiconductor memory or the like for recording captured images or image data, and executes recording of image data and reading out of recorded image data according to control by the memory medium I/F unit 104. In the present embodiment, a removable memory medium (e.g., memory card) is used as the memory medium 105, but a built-in memory medium may also be used.

A GPU 115 is a rendering engine that renders various information displays and menu screens of the video camera in a VRAM (not shown), and is provided with an enlargement-reduction rendering function, a rotation rendering function and a layer compositing function, in addition to a function of rendering character strings and graphics. The VRAM is provided with an alpha channel representing transmittance, and is able to perform onscreen display of contents rendered in the VRAM on a captured image or a playback image using a display I/F unit 106.

The display I/F unit 106 performs superimposing/compositing and resizing processing on image data (captured images, playback images) from the image processing unit 118 and display contents rendered in the VRAM by the GPU 115, and the processing results are output to (displayed on) the display unit 107. When in an enlarged display mode, the display I/F unit 106 performs superimposing/compositing and resizing processing on a partial area of video data. In the enlarged display mode, video enlarged to greater than normal is displayed on the display unit 107, thus enabling the image taker to perform a focus adjustment operation by manual focusing (hereinafter, MF) more accurately. The display unit 107 includes an external monitor and a display unit within the finder that are viewable from the casing 100 side and display image data output by the display I/F unit 106 for use in checking the angle of view. The display unit 107 can be constituted by a liquid crystal display, an organic light-emitting diode display or the like.

A microcomputer 119 is a control unit that performs overall control of the operations of the digital camera 10, and is constituted by a microcomputer or the like. The microcomputer 119 is provided with a CPU 119a, a ROM 119b, and a RAM 119c. The CPU 119a executes the operations of the various flowcharts described later, by extracting computer programs stored in the ROM 119b to the RAM 119c and executing the programs.

A gain control unit 109, a shutter control unit 110, an ND control unit 111 and a diaphragm control unit 112 are all blocks for exposure control. These blocks are controlled by the microcomputer 119, based on luminance levels calculated by the microcomputer 119 from the image data output by the image processing unit 118 or based on operation parameters manually set by the image taker. The gain control unit 109 controls the gain of the image capture device 102. The shutter control unit 110 controls the shutter speed of the image capture device 102. The ND control unit 111 controls the amount of light that is incident on the image capture device 102 via the ND filter 103. The diaphragm control unit 112 controls the diaphragm of the interchangeable lens 101.

A focus control unit 113 performs operations that differ depending on whether a focus drive state of the digital camera 10 by the microcomputer 119 is autofocus (hereinafter, AF) or manual focus (hereinafter, MF). When the focus drive state is AF, the microcomputer 119 calculates focus information relating to focusing with reference to the image data output by the image processing unit 118, and the focus control unit 113 controls the focus lens within the interchangeable lens 101 based on that focus information. Alternatively, in AF, the focus control unit 113 controls the focus lens within the interchangeable lens 101 on the basis of the defocus amount output by the distance-measuring unit 108 by image capture surface phase difference detection. When the focus drive state is MF, the focus control unit 113 stops AF control. In this case, the image taker is able to perform suitable focus adjustment by rotating a focus ring 134 incorporated in the interchangeable lens 101.

Note that, in AF of the present embodiment, an AF frame is set in a partial area of image data, and focus information is calculated based only on the object within the AF frame. Also, AF of the present embodiment is provided with two AF operation modes, namely, a one-shot AF mode and a continuous AF mode (servo AF). In the one-shot AF mode, AF control is only performed when a one-shot AF key 129 is pressed, and control by the focus control unit 113 stops after focusing success or focusing failure is determined. In the continuous AF mode, AF control is always performed. Even in the continuous AF mode, however, control by the focus control unit 113 is stopped, when in an AF lock state due to an AF lock key 130 being pressed. Switching of these two AF operation modes is performed by changing the settings on a menu screen.

An antivibration control unit 114 performs optical antivibration processing for controlling the shift lens within the interchangeable lens 101 so as to offset blurring on the basis of motion vectors of the object calculated by the microcomputer 119 with reference to the image data output by the image processing unit 118. Alternatively, the antivibration control unit 114 may perform electronic antivibration processing for clipping images in each frame of a moving image in a direction that offsets image blur caused by camera shake.

A memory I/F unit 116 writes RAW image data for all of the pixels output by the image capture device 102 to a memory 117, and also reads out RAW image data held in the memory 117 and outputs that image data to the image processing unit 118. The memory 117 is a volatile storage medium that stores several frames worth of RAW image data for all of the pixels. The image processing unit 118 performs image processing required for control on the RAW image data for all of the pixels sent from the memory I/F unit 116.

An external output I/F unit 120 performs resize processing on video data from the image processing unit 118. Also, the external output I/F unit 120 performs signal conversion that conforms to the standard of the external output unit 121 and assignment of control signals on the video data, and outputs the resultant video data to the external output unit 121. The external output unit 121 is a terminal that outputs the video data externally, and is, for example, an SDI (Serial Digital Interface) terminal or an HDMI (registered trademark) (High-Definition Multimedia Interface) terminal. External devices such as a monitor display and an external recording apparatus are connectable to the external output unit 121.

An external operation IX unit 122 is an interface that receives control instructions issued by an external operation unit 123, and notifies those control instructions to the microcomputer 119. The external operation I/F unit 122 corresponds, for example, to an infrared remote control light-receiving unit, a wireless LAN (Local Area Network) interface or LANC (registered trademark) (Local Application Control bus system). The external operation unit 123 transmits control instructions (control commands) to the external operation I/F unit 122. The external operation unit 123, in addition to being able to transmit instructions (commands) corresponding to the operations of the constituent elements of the operation units (124 to 135) incorporated in the casing 100 or the interchangeable lens 101, is also able to transmit setting change information on a menu screen that is displayed on the display unit 107.

The operation units from a menu key 124 to an AF/MF switch 135 are constituted by members such as keys (buttons), a dial, a tact switch, a ring and a touch panel. All of these operation units accept operations from the image taker and play a role in notifying control instructions to the microcomputer 119. The menu key 124 to a START/STOP key 133 are operation units on the main body side that are assembled to the casing 100. The focus ring 134 and the AF/MF switch 135 are operation units on the lens side that are assembled to the interchangeable lens 101. With some of these operation units, it is also possible to interchange the role of keys and to assign different functions, through settings on a menu screen.

The menu key 124 gives an instruction for displaying a menu screen on the display unit 107, and an instruction for closing a menu screen that is already open. A D-pad 125 and a dial 126 both give instructions for moving a cursor for selecting items on a menu screen, and for moving frame display relating to focusing in a direction that is desired by the image taker. The D-pad 125 is an arrow key that consists of an up key, a down key, a left key and a right key, which may be separate operation members, or may be constituted as one operation member and such that one of up, down, left and right can be instructed according to the position that is pressed. The dial 126 is a rotational operation member on which a clockwise operation and a counterclockwise operation can be performed.

A SET key 127 gives instructions for selecting an item at which the cursor is positioned on a menu screen, and for determining various types of selling operations. A CANCEL key 128 gives instructions for returning to the previous layer when making a selection at a deep layer on a menu screen, and for discarding various types of setting operations. The one-shot AF key 129, when the AF mode is the one-shot AF, gives an instruction for driving AF using the focus control unit 113. The AF lock key 130, when the AF mode is the continuous AF, gives a stop instruction for stopping control by the focus control unit 113, and a cancel instruction for canceling the state in which control is stopped.

An enlargement key 131 gives instructions for enlarging video that is displayed on the display unit 107 and returning enlarged video to the original size. A DISPLAY key 132 gives an instruction for changing a Disp level that is held by the microcomputer 119. The display of various information on the display unit 107 is restricted, based on the selected Disp level, and more detailed information can be displayed or video can be displayed more clearly. A START/STOP key 133 gives instructions for starting and stopping recording by the memory medium I/F unit 104. The focus ring 134, when the focus drive state is MF, is able to move the focus lens within the interchangeable lens 101, and perform focus adjustment. The AF/MF switch 135 gives instructions for alternately switching the focus drive state, that is, between AF and MF.

Image Capture Surface Phase Difference Detection

FIGS. 2A and 2B show part of a light-receiving surface of the image capture device 102 serving as an image sensor. In the image capture device 102, pixel units that each hold two photodiodes, which are light-receiving units serving as photoelectric conversion means, with respect to one micro lens are arranged in an array, in order to enable image capture surface phase difference AF. Luminous flux obtained by splitting the exit pupil of the interchangeable lens 101 can thereby be received with each pixel unit. FIG. 2A is a schematic diagram showing part of an image sensor surface employing a non-image capture surface phase difference method that has red (R), blue (B) and green (Gb, Gr) color filters in an exemplary Bayer array. FIG. 2B shows an example of pixel units employing an image capture surface phase difference method that each hold two photodiodes serving as photoelectric conversion means with respect to one micro lens, in correspondence with the array of color filters in FIG. 2A.

The image capture device 102 having the configuration of FIG. 2B is able to output two signals for use in phase difference detection (hereinafter, also referred to as an A image signal and a B image signal) from each pixel unit. The image capture device 102 is also able to output a signal for use in image capture recording obtained by adding the signals (A image signal+B image signal) of the two photodiodes. In the case of the added signal, a signal equivalent to the output of the image sensor of the exemplary Bayer array schematically described with FIG. 2A is output.

Using such output signals from the image capture device 102 serving as an image sensor, the distance-measuring unit 108 performs a computation for correlating the two image signals, and calculates information such as the defocus amount and various types of reliability. That is, the distance-measuring unit 108 calculates the defocus amount on the image capture surface, based on the shift between the A image signal and the B image signal. The defocus amount has a positive or negative value, and the determination as to front-focused or rear-focused can be made depending on whether the defocus amount is a positive value or a negative value. Also, the degree of focus can be determined by the absolute value of the defocus amount, with a defocus amount of 0 indicating a focused state. That is, the distance-measuring unit 108 outputs information indicating front-focused or rear-focused to the CPU 119a and the like on the basis of the positive or negative value of the defocus amount calculated for a focus measurement area which is a distance-measuring position (distance-measuring area, focus detection position, focus detection area). Also, the distance-measuring unit 108 outputs degree-of-focus information which is the degree of focus (degree of shift from being in focus) to the CPU 119a and the like, based on the absolute value of the defocus amount. The distance-measuring unit 108 outputs information indicating front-focused or rear-focused in the case where the defocus amount exceeds a predetermined value, and outputs information indicating the focused state in the case where the absolute value of the defocus amount is within a predetermined value. Note that the degree-of-focus information is output as a value obtained by converting the defocus amount into an operation amount for rotating the focus ring 134 to achieve the focused state.

Note that, in the present embodiment, the image capture device 102 outputs a total of three signals consisting of a signal for use in image capture and two signals for use in phase difference detection, but is not limited to such a configuration. For example, a configuration may be adopted in which a total of two signals are output, namely, the signal for use in image capture and one of the two signals for use in phase difference AF. In this case, the one of the two signals for use in phase difference detection that is not output is calculated utilizing the above two output signals from the image capture device 102.

Also, FIGS. 2A and 2B show an example in which pixel units each holding two photodiodes serving as photoelectric conversion means with respect to one micro lens are arranged in an array, but the present invention is not limited thereto. For example, a configuration may be adopted in which pixel units each holding three or more photodiodes serving as photoelectric conversion means with respect to one micro lens are arranged in an array. Also, a configuration may be adopted in which a plurality of pixel units each having a different opening position of the light-receiving unit in relation to the micro lens are provided. In other words, it is sufficient if two signals for use in phase difference detection that enable phase difference detection, namely, the A image signal and the B image signal, are obtained as a result.

Assist Function and Exemplary Screens

The digital camera 10 in the present embodiment is provided with a "focus guide" function and a "captured image enlarged display" function as focus assist functions. The "focus guide" function is a mode in which the focus state of an area designated by the user is indicated with an index, and, using the index, the user is able to check whether the focus state is the focused state (state where the object in the focus detection area is in focus), front-focused or rear-focused. "Captured image enlarged display" is a function for displaying a captured image of an area designated by the user at a suitable magnification, and enables the user to check the captured image in greater detail. Exemplary display of screens at the time of execution of the "focus guide" function and the "captured image enlarged display" function will be described with FIGS. 3A and 3B, FIGS. 4A to 4C, and FIG. 5.

A screen 300 in FIG. 3A is an example of a screen that is displayed on the display unit 107, and an object 303 and an object 304 are part of the image data from the image processing unit 118. Also, on the screen, a recordable time period 301, a recording time code 302 and a focus guide 307 (rectangular focus guide frame 305 and triangle index 306) are all superimposed as OSD on the image data. This OSD is contents that the GPU 115 rendered in the VRAM for OSD according to an instruction of the CPU 119a. As aforementioned, the screen 300 of FIG. 3A is displayed on the display unit 107 by the GPU 115 compositing the VRAM for OSD and video data.

Note that the focus index that is displayed as the focus guide 307 changes according to the focus state. The focus index represents the focus state by changing the display form of the rectangular focus guide frame 305 that indicates the focus measurement area and the display form of the plurality of triangle indices 306 positioned thereabove. Examples of such focus indices are shown in FIG. 3B. A focus index 310 is a focused state (state where the object in the focus detection area is in focus), and is constituted by the focus guide frame 305 and the triangle index 306 that consists of two facing triangles positioned thereabove. A focus index 311 indicates that the focus state is rear-focused state. The focus index 311 differs from the focus index 310 and indicates that the focus state is not the focused state by the upper triangles of the triangle index 306 positioned above the focus guide frame 305 being separated, and indicates the shift amount from the focused state by the angle of the triangles that are separated. Also, since the focus state is not the focused state, the focus guide frame 305 indicating the focus measurement area is shown with square brackets. A focus index 312 indicates that the focus state is the front-focused state. The focus index 312 differs from the focus index 311, with the lower triangles of the triangle index 306 positioned above the focus guide frame 305 being separated. The user can distinguish the front-focused and rear-focused states by which of the upper and lower triangles are separated.

A focus index 313 indicates that the focus state is a very blurred state in which determination as to front-focused or rear-focused failed (i.e., distance-measuring failed). A focus index 314 indicates a sub-frame. The sub-frame will always be a fixed display (only show a position), since the user is able to dispose the sub-frame at the position where the pervious focus state was checked or at a position where he or she wants to check the focus state next, and the focus state of the sub-frame is not shown as an index. Switching of the sub-frame and the (main) focus guide will be described with FIG. 5.

As described above, the user is able to check the focus state of a target area, as a result of the focus indices 310 to 314 being displayed as a focus guide. Accordingly, the focus indices 310 to 314 help in checking whether focus adjustment has been performed as intended by the user, when performing a MF operation or the like. Note that the focus indices 310 to 314 are examples that visually represent the focus state, and the focus state may be represented with colors or other means of expression. For example, a configuration may be adopted in which the focus guide frame 305 of the focus index 310 is shown with a green rectangle and the focus guide frame 305 of the other focus indices is shown with a red rectangle. Alternatively, the focus state may be represented by the change in the display form of the focus guide frame 305, and the triangle index 306 may be omitted.

Figure 4B:
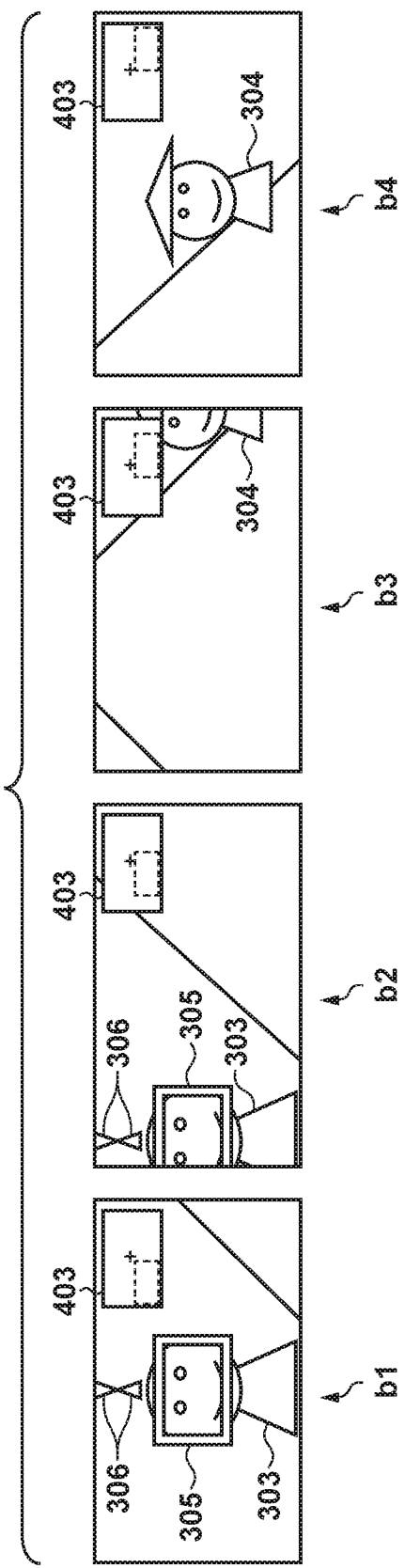
Figure 4C:
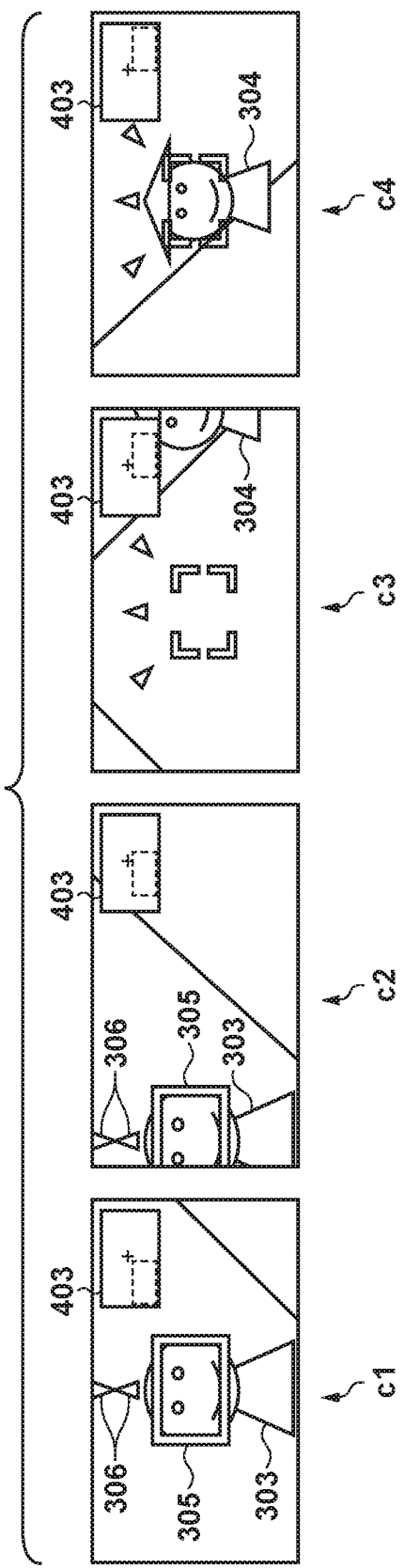

FIGS. 4A to 4C show examples of screens that are displayed on the display unit 107 at the time of the operation of the "captured image enlarged display" function. In FIG. 4A, an enlarging area 401 and an enlarging area 402, which are the areas of the image that are targeted for enlarged display, exist on a screen 300. The enlarging areas 401 and 402 and an arrow therebetween have been made visible in order to facilitate description. When the user executes the "captured image enlarged display" function in the state where the screen 300 is displayed, the area of the enlarging area 401 centering on the focus guide frame 305 is enlarged, and an image of the area of the enlarging area 401 is displayed on the display unit 107. This enlargement processing is performed by the image processing unit 118 or the GPU 115. Also, the area of the enlarging area 401 is enlarged centering on the focus guide frame 305 (focus measurement area).

After execution of the "captured image enlarged display" function, it is possible for the user to move the position of the enlarging area (hereinafter, enlarging position) using the D-pad 125. Examples of screens that are displayed on the display unit 107, when the enlarging area 401 is moved rightward to the position of the enlarging area 402, for example, are shown in FIG. 4B and FIG. 4C. This operation is premised on the user performing an operation for focusing on e object 303 and, thereafter, for focusing on the object 304. This operation enables shooting in which focus shifts from a specific person to another person to be performed. The images that are displayed on the screen 300 in FIG. 4B and FIG. 4C are enlarged images obtained by the images of the respective enlarging areas being enlarged.

In FIG. 4B, b1 to b4 are exemplary screen displays illustrating the problem of the present invention. In FIG. 4B, an enlarged display position index 403 is newly displayed on the screen 300 as DSD together with the enlarged image. Using this enlarged display position index 403, the user is able to check which area of the entire captured image has been enlarged and the magnification. The exemplary screen b1 shows a screen obtained by the enlarging area 401 centering on the focus guide frame 305 being displayed in an enlarged manner, and the entire object 303 is displayed. At this time, the focus guide 307 (the focus guide frame 305 and the triangle index 306) is also displayed in an enlarged manner. When the user presses the right key of the D-pad 125 in this state, the enlarging position moves and the display area further on the right side is enlarged. The exemplary screen b2 is an example of a screen that is displayed on the display unit 107 when the user presses the right key of the D-pad 125 several times in the state of the exemplary screen bit. In this state, about 80 percent of the object 303 and the focus guide frame 305 is visible. Although the area of enlarged display has changed from the exemplary screen hi, the position of the focus guide frame 305 in the entire captured image is fixed (fixed at the position of the object 303). Accordingly, the user is able to continue to check the focus state (degree of focus) of the object 303.

The exemplary screen b3 is an example of a screen that is displayed on the display unit 107 when the user presses the right key of the D-pad 125 several times from the state of the exemplary screen b2. In this state, the object 303 and the focus guide frame 305 are not visible, and part of the object 304 is visible. The exemplary screen b4 is an example of a screen that is displayed on the display unit 107 when the user presses the right key of the D-pad 125 several times in the state of the exemplary screen b3. In this state, the entire object 304 is visible. In this way, the focus guide is no longer displayed when the enlarging position is shifted such that the object 304 is centered in order for the user to check the focus state of the object 304. Thus, in this state, the user is unable to check the focus state in detail using the focus guide. In order to check the focus state of the object 304 with the focus guide, the user needs to move the focus guide after first canceling the "captured image enlarged display".

In FIG. 4C, c1 to c4 are exemplary screen displays according to the present embodiment which solves the above problem. Processing for realizing such display will be described with the flowchart of FIG. 7. The enlarged display position index 403 is also displayed as OSD on the screen 300 in FIG. 4C together with the enlarged image, similarly to FIG. 4B. The exemplary screen c1 is a screen obtained by the enlarging area 401 centering on the focus guide frame 305 being displayed in an enlarged manner, and the entire object 303 is displayed. At this time, the focus guide 307 is also displayed in an enlarged manner. When the user presses the right key of the D-pad 125 in this state, the enlarging position moves and the display area further on the right side is enlarged. The exemplary screen c2 is an example of a screen that is displayed on the display unit 107 when the user presses the right key of the D-pad 125 several times in the state of the exemplary screen c1. In this state, about 80 percent of the object 303 and the focus guide frame 305 is visible. Although the area of enlarged display has changed from the exemplary screen c1, the position of the focus guide frame 305 in the entire captured image is fixed (fixed at the position of the object 303). Accordingly, the user is able to continue to check the focus state (degree of focus) of the object 303.

The exemplary screen c3 is an example of a screen that is displayed on the display unit 107 when the user presses the right key of the D-pad 125 several times in the state of the exemplary screen c2. In this state, the focus guide frame 305 is no longer visible (the focus measurement area left the enlarging area), and thus a focus guide is newly displayed in the center of the screen. The exemplary screen c4 is an example of a screen that is displayed on the display unit 107 when the user presses the right key of the D-pad 125 several times in the state of the exemplary screen c3. In this state, the entire object 304 is visible, and the focus guide is displayed in the center of the screen. As shown in the exemplary screen c3, the focus state of the area that is being displayed in an enlarged manner can be checked, by displaying a new focus guide fixed at the position of the center of the screen, when the focus guide leaves the screen display area and is no longer visible. Also, in the case of wanting to check the focus state of the object 304, the user is able to check the focus state of the object 304, by shifting the enlarging position so that the object 304 is centered. According to the above, the user is able to check the focus state of the object 304 using a focus guide, without going to the trouble of canceling the "captured image enlarged display".

Note that, in the above, a focus guide frame is newly displayed in the center of the screen on condition that the focus guide frame 305 is no longer displayed, but the present invention is not limited thereto. For example, a configuration may be adopted in which a new focus measurement area is set in the center of the screen and a focus guide is displayed on condition of a predetermined percentage of the rectangular frame (i.e., focus measurement area) of the focus guide frame 305 no longer being displayed (50 percent or more, 80 percent or more, etc.). Also, a configuration may be adopted in which a new focus measurement area is set in the center of the screen and a focus guide is displayed, on condition that the focus guide frame 305 has left or has reached the point of leaving a predetermined area inside the screen (an area on the periphery of the screen edge having a predetermined distance from the screen edge). In the case where a new focus measurement area is set, a sub-frame may be displayed at the position of the focus guide that was displayed up to that point in time. Also, the position of the focus guide that was displayed up to that point in time (position of the measurement area) may be stored in the RAM 119c or the like. Also, the operation of moving the enlarging area is not limited to the right-left direction, and may be the up-down direction.

FIG. 5 shows examples of screen displays that are displayed on the display unit 107 when the sub-frame display of the "focus guide" function is in an enabled state. As aforementioned, the "focus guide" function is a function that enables the user to dispose the sub-frame at the position where the previous focus state was checked or at a position where the user wants to check the focus state next. Sub-frame display can be switched ON and OFF on a menu, and the default value is the center of the screen. When the SET key 127 is pressed in a state where the focus guide frame and the sub-frame are displayed, the focus guide frame is displayed at the position of the sub-frame and the sub-frame is displayed at the position where the focus guide frame was originally displayed. That is, the SET key 127 interchanges the position of the sub-frame and the position of the focus guide frame. In this way, the SET key 127 functions as a switching unit for switching the position of the sub-frame and the position of the focus guide frame. For example, when the SET key 127 is pressed in the state of 5A in FIG. 5, the sub-frame 308 and the focus guide 307 are switched, as shown in 5B in FIG. 5. Similarly, when the SET key 127 is pressed in the state of the display of 5B in FIG. 5, the sub-frame 308 and the focus guide 307 are switched to the display state of 5A in FIG. 5.

Processing of Assist Function

Figure 6A:
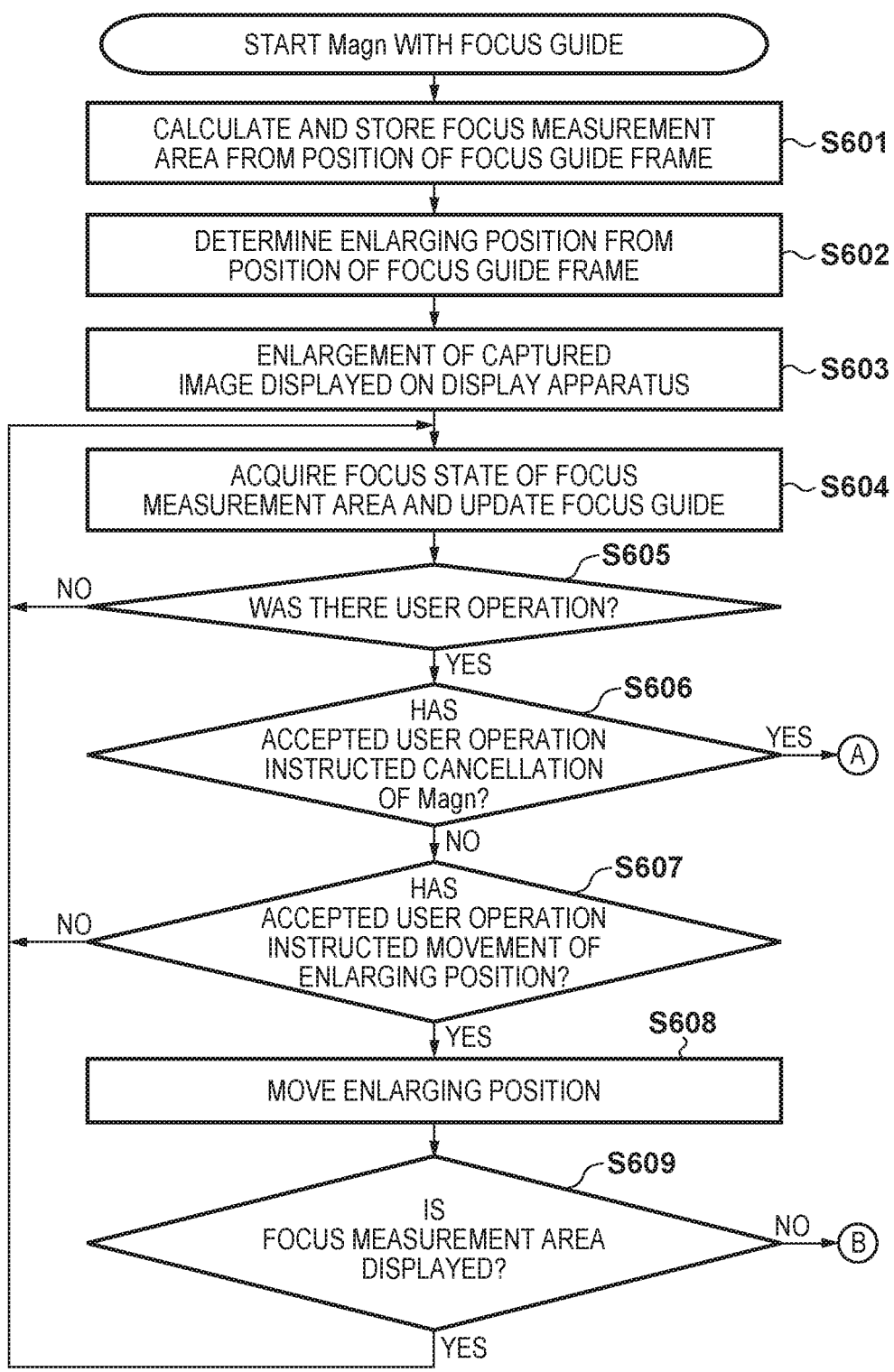
Figure 8A:
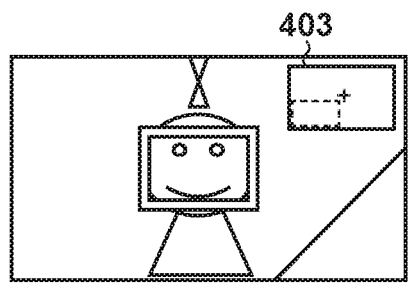
FIGS. 8A to 8D are diagrams showing an example of a screen when an operation is performed after enlarged display according to a second embodiment.
Figure 8B:
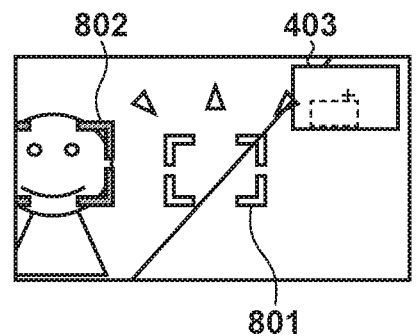
Figure 8C:
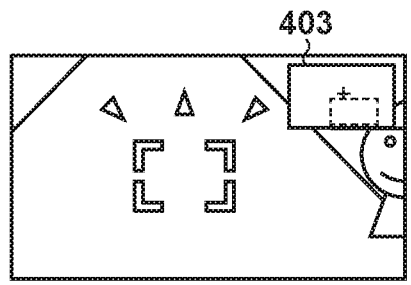
Figure 8D:
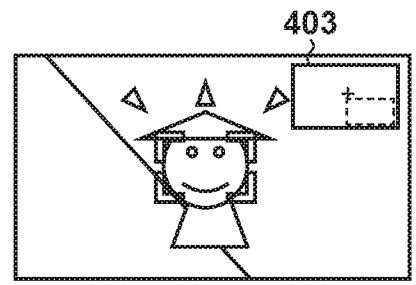

FIGS. 6A and 6B are flowcharts showing control when the "captured image enlarged display" function is enabled and the digital camera 10 is operated at the time that the "focus guide" function is in an enabled state. The processing that is shown in the flowcharts of FIGS. 6A and 6B is realized, by the CPU 119a reading out a computer program from the ROM 119b and then extracting and executing the program in the RAM 119c. This flowchart is started by the "captured image enlarged display" function being enabled at the time that the "focus guide" function is in an enabled state, when the operation mode is the shooting mode. Note that, in the flowchart, the "captured image enlarged display" is shown using the abbreviation "Magn".

In S601, the CPU 119a calculates the focus measurement area from the position of the current focus guide frame, and stores the calculated focus measurement area in the RAM 119c. In S602, the CPU 119a determines the enlarging position from the position of the focus guide frame. Here, the CPU 119a determines the enlarging position such that the position of the focus guide frame is centered. In S603, the CPU 119a generates an enlarged image from the captured image on the basis of the enlarging position determined in step S602, and displays the enlarged image on the display unit 107. This processing for enlarging the captured image is performed by the image processing unit 118 or the GPU 115.

In step S604, the CPU 119a acquires the focus state of the focus measurement area (refer to the description of FIGS. 2A and 2B regarding the calculation method), and updates the focus guide. Updating of the focus guide involves displaying the focus guide using one of the focus indices shown in FIGS. 3A and 3B that has been selected according to the focus state. Note that in the case of the focus index 311 or the focus index 312, the triangle index (angle of the triangles) that is displayed above the focus guide frame 305 changes depending on the focus state. As described above, the processing of steps S601 to S604 is first display processing for displaying an enlarged image of the enlarging area that includes the focus measurement area and a focus guide corresponding to the focus measurement area on the display unit 107.

In step S605, the CPU 119a determines whether there has been a user operation. If it is determined that there has not been a user operation, the CPU 119a returns the processing to step S604, and repeats the updating of the focus guide frame in accordance with the change in the shooting situation and the determination of whether or not there has been a user operation. If it is determined that there has been a user operation, the CPU 119a, in step S606, determines whether the user operation accepted in step S605 is an instruction for canceling the "captured image enlarged display". If it is determined that the user operation is an instruction for canceling the "captured image enlarged display", the processing advances to step S616, and if it is determined that the user operation is not an instruction for canceling the "captured image enlarged display", the processing advances to step S607.

In step S607, the CPU 119a determines whether with the user operation accepted in step S605 is a move instruction for moving the enlarging position of the "captured image enlarged display". If it is determined that the user operation is not an instruction for moving the enlarging position of the "captured image enlarged display", the CPU 119a returns the processing to step S604. On the other hand, if it is determined that the user operation accepted in step S605 is an instruction for moving the enlarging position of the "captured image enlarged display", the processing advances to step S608. In step S608, the CPU 119a changes the enlarging position and updates the enlarged image. That is, the CPU 119a calculates the enlarging position according to the operation determined in step S607, enlarges the image of the enlarging area based on the calculated enlarging position to generate an enlarged image, and updates the display of the display unit 107. As described above, the processing of step S607 is second display processing for displaying an enlarged image of the enlarging area after moving according to the move instruction from the user on the display unit 107.

Next, in step S609, the CPU 119a determines whether the focus measurement area is displayed on the screen. If it is determined that the focus measurement area is displayed on the screen, the CPU 119a returns the processing to step S604, and repeats the above processing. In the first embodiment, whether or not the focus measurement area is displayed on the screen is determined by whether or not the focus guide frame is displayed on the screen. Thus, if even part of the focus guide frame is displayed on the screen as with exemplary screen c2 in FIG. 4C, it is assumed that the focus measurement area is displayed on the screen. As a result of the processing to step S609, the focus measurement area is maintained while the focus guide frame is being displayed on the screen.

On the other hand, if it is determined in step S609 that the focus measurement area is not displayed on the screen, the CPU 119a, in step S610, stores the current focus measurement area in the PAM 119c as a sub-frame area. In step S611, the CPU 119a then stores a central area of the current enlarging area in the RAM 119c as the focus measurement area, and further acquires the focus state of the set focus measurement area and updates the focus guide. The processing for updating the focus guide here is the same as step S604. That is, the focus guide frame 305 is displayed at the position of the new focus measurement area, and the triangle index 306 is displayed thereabove. The display form of the focus guide frame 305 and the triangle index 306 is based on the focus state measured for the new focus measurement area.

As described above, the processing of step S609 is third display processing for newly setting a focus measurement area in a predetermined area of the enlarging area after being moved, when the moving instruction satisfies a predetermined condition, and displaying the enlarged image of this enlarging area and a focus guide corresponding to the new focus measurement area on the display unit 107. Note that the predetermined condition is the entire focus measurement area leaving the screen, and the predetermined area is the central area.

In step S612, the CPU 119a determines whether there has been a user operation. If there has not been a user operation, the CPU 119a repeats the processing of step S611 and step S612, and updates the focus guide frame in accordance with the change in the shooting situation. If it is determined in step S612 that there has been a user operation, the processing advances to step S613. In step S613, the CPU 119a determines whether the user operation accepted in step S612 is an instruction for canceling the "captured image enlarged display". If it is determined that the user operation is an instruction for canceling the "captured image enlarged display", the processing advances to step S616, and if it is determined that the user operation is not an instruction for canceling the "captured image enlarged display", the processing advances to step S614.

In step S614, the CPU 119a determines whether the user operation accepted in step S612 is an instruction for moving the enlarging position of the "captured image enlarged display". If it is determined that an instruction for moving the enlarging position of the "captured image enlarged display" has been received, the processing advances to step S615. On the other hand, if it is determined that the user operation is not an instruction for moving the enlarging position of the "captured image enlarged display", the processing returns to step S611 and the abovementioned processing is repeated. In step S615, the CPU 119a moves the enlarging position (enlarging area), generates an enlarged image of the enlarging position after being moved, and displays the enlarged image on the display unit 107. Thereafter, the processing returns to step S611, and the abovementioned processing from step S611 onward is repeated.

Steps S616 and S617 involve processing for canceling the "captured image enlarged display". In step S616, the CPU 119a cancels enlargement of the captured image. As a result of canceling enlargement, the entire captured image is displayed on the display unit 107. In step S617, the CPU 119a then updates display of the focus guide frame and the sub-frame, and completes the processing for canceling the "captured image enlarged display". Specifically, the CPU 119a acquires the focus state of the focus measurement area and updates the focus guide frame, and acquires the focus state of the sub-frame area and updates the sub-frame. For example, display such as shown in 5A in FIG. 5 will be performed when the processing for canceling the "captured image enlarged display" is performed in the state of the exemplary screen c4 in FIG. 4C.

Note that, in FIGS. 6A and 6B, the focus measurement area and the sub-frame area are stored in the RAM 119c, but may be stored in the ROM 119b that maintains the memory contents even after power supply has been turned off. Also, the horizontal and vertical size of the focus measurement area and the sub-frame area is not particularly limited.

FIG. 7 is a flowchart showing control when sub-frame switching is executed at the time that the "focus guide" function is in an enabled state. The processing shown in the flowchart of FIG. 7 is realized, by the CPU 119a reading out a computer program from the ROM 119b and then extracting and executing the program in the RAM 119c. This flowchart is started by the "focus guide" function being enabled when the operation mode is the shooting mode. As described above, the SET key 127 functions as a switching unit that accepts a switching instruction by the user. Note that, in FIG. 3B, display of the focus index 314 of the sub-frame does not indicate the focus state, but the display form may be changed according to the focus state as with the focus guide 307, even with the focus index 314 of the sub-frame. The flowchart of FIG. 7 shows the case where processing in which the display form of the sub-frame is updated according to the focus state is included. Note that, in this case, acquisition of the focus state and update processing are also performed in the flowcharts of FIGS. 6A and 6B, in the same manner as the focus guide, if the sub-frame is displayed.

In step S701, the CPU 119a acquires the focus state of the focus measurement area, and performs processing for updating the focus guide. The processing for updating the focus guide is similar to FIG. 6A (step S604). Next, in step S702, the CPU 119a acquires the focus state of the sub-frame area, and performs processing for updating the sub-frame. Next, in step S703, the CPU 119a determines whether the SET key 127 has been pressed. If it is determined that the SET key 127 has not been pressed, the processing returns to step S701, and abovementioned processing is repeated. On the other hand, if it is determined in step S703 that the SET key 127 has been pressed, the processing advances to step S704.

In step S704, the CPU 119a switches the positions of the focus measurement area and the sub-frame area. Next, in step S705, the CPU 119a acquires the focus state of the focus measurement area, and performs processing for updating the focus guide frame. In step S706, the CPU 119a then acquires the focus state of the sub-frame area, and performs processing for updating the sub-frame. Processing for switching the sub-frame is thus ends.

As described above, according to the first embodiment, a central area on the screen that is displayed is set as the focus measurement area (exemplary screen c3, exemplary screen c4 in FIG. 4C), in the case where the focus guide frame is no longer displayed due to a change in the enlarging position after the "captured image enlarged display" was enabled. Thus, checking of the focus state of an object whose focus the user wants to check next can be realized without changing the position of the focus guide frame. That is, in the case of wanting to check another focus state when in enlarged display, the user is able to check the focus state at a prescribed location, without going to the trouble of canceling enlarged display and moving the focus guide frame. Furthermore, the position of the focus guide frame before being changed is stored as a sub-frame, even assuming the position of the focus guide frame has changed after "captured image enlarged display" is enabled. Thus, it is possible for the user to easily return to the position of the original focus guide frame (FIG. 5), and an apparatus can be provided that is user-friendly even for a user who wants to return the focus guide frame to the original position.

Note that the processing for switching the focus guide frame and the sub-frame described using FIG. 7 may also be performed during enlarged display. In this case, the enlarging area that is targeted for enlarged display is also desirably switched, in response to the switching of the focus guide frame and the sub-frame during enlarged display, to an area centering on the focus guide frame after the switching. Enlarged display of the object at the position of the focus guide frame and enlarged display of the object of the position of the sub-frame can thereby be switched easily and quickly. For example, the display state of the exemplary screen c1 in FIG. 4C and the display state of the exemplary screen c4 in FIG. 4C switch whenever the SET key 127 is pressed. Note that a configuration may be adopted in which changing of the enlarging area is executed, according to whether or not the focus guide frame and the sub-frame both fit in the enlarged display area. That is, a configuration may be adopted in which, in the case where both frames fit in the enlarged display area, the enlarging area is not changed even when the frames are switched in response to the SET key 127 being pressed. On the other hand, in the case where the SET key 127 is pressed in a state where at least one of the frames does not fit in the enlarged display area, the enlarging area is changed such that the position of the frame that is the new focus guide frame is centered.

Second Embodiment

In the first embodiment, the focus guide frame is displayed in a central area of enlarged display, when the focus guide frame leaves the screen (leaves the enlarging area). However, the present invention is not limited thereto. In the second embodiment, the focus guide frame is displayed in a central area of enlarged display, in the case where the operation for moving the enlarging area exceeds a predetermined number of times. Note that the hardware configuration is similar to the first embodiment.

FIGS. 8A to 8D show examples of screens that are displayed on the display unit 107 when the "captured image enlarged display" function is operated in the second embodiment. Unlike the exemplary screen c2 in FIG. 4C, in the state of FIG. 8B, a focus guide frame 801 is displayed in the center of the enlarged display. Since the operation for moving the enlarging area exceeds a predetermined operation amount, when having moved from the enlarging position of the screen display of FIG. 8A, to the enlarging position of the screen display of FIG. 8B, the focus guide frame 801 is displayed in a central area of the enlarged display. At this time, a sub-frame 802 is displayed at the position where the focus guide frame was displayed up to that point in time. In subsequent screen displays (FIG. 8C, FIG. 8D), the previous focus measurement area (sub-frame 802) disappears from the screen, and the display contents are similar to the exemplary screens c3 and c4 in FIG. 4C. Note that the move operation that is targeted for measurement of the operation amount is not limited to the left-right direction. In the case where total operation amount of the move operation in the up-down and left-right directions exceeds a predetermined operation amount, the focus guide frame is displayed in the center of the enlarged display.

Figure 9A:
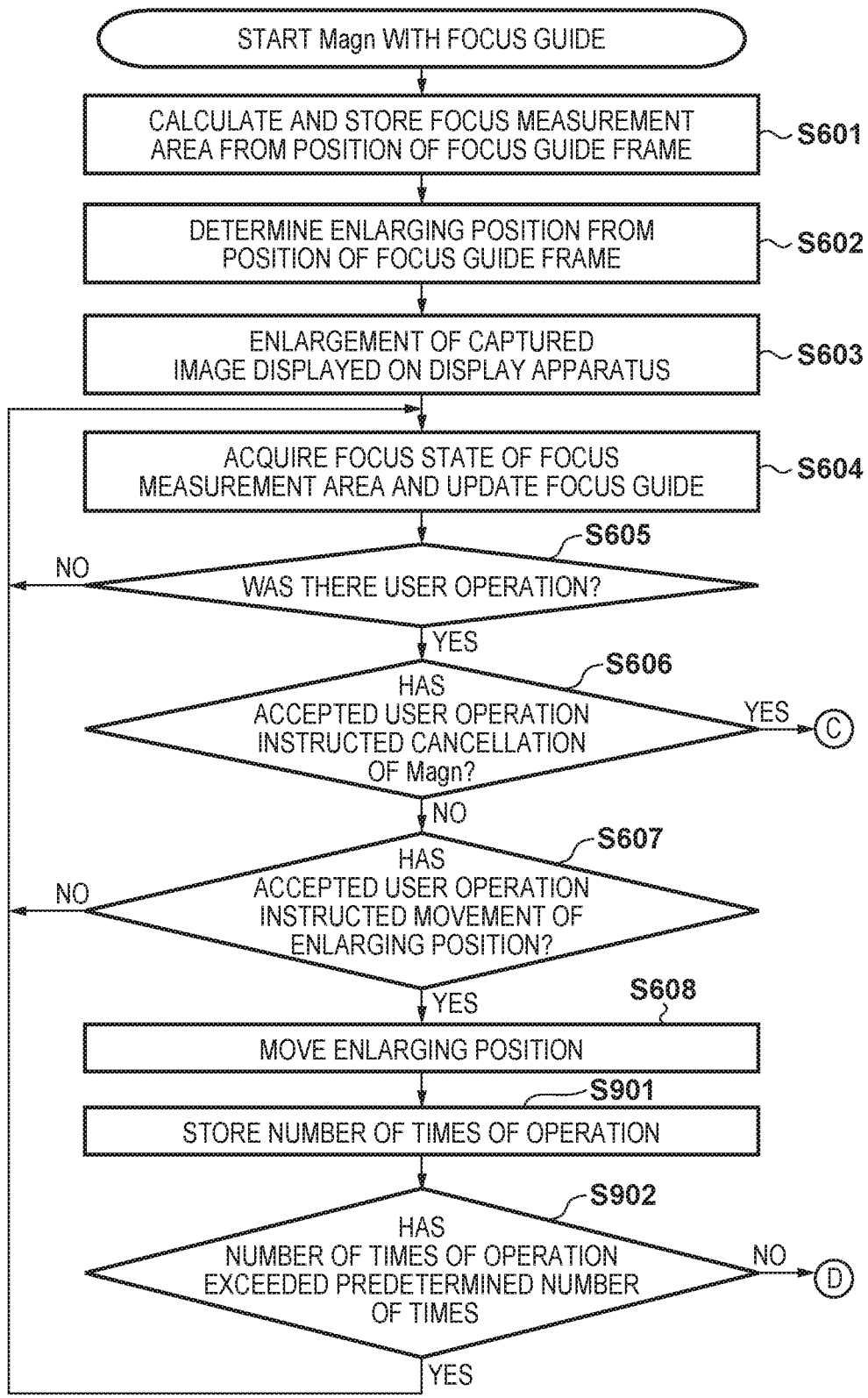
FIGS. 9A and 9B are flowcharts of processing at the time of enlarged display according to the second embodiment.
Figure 9B:
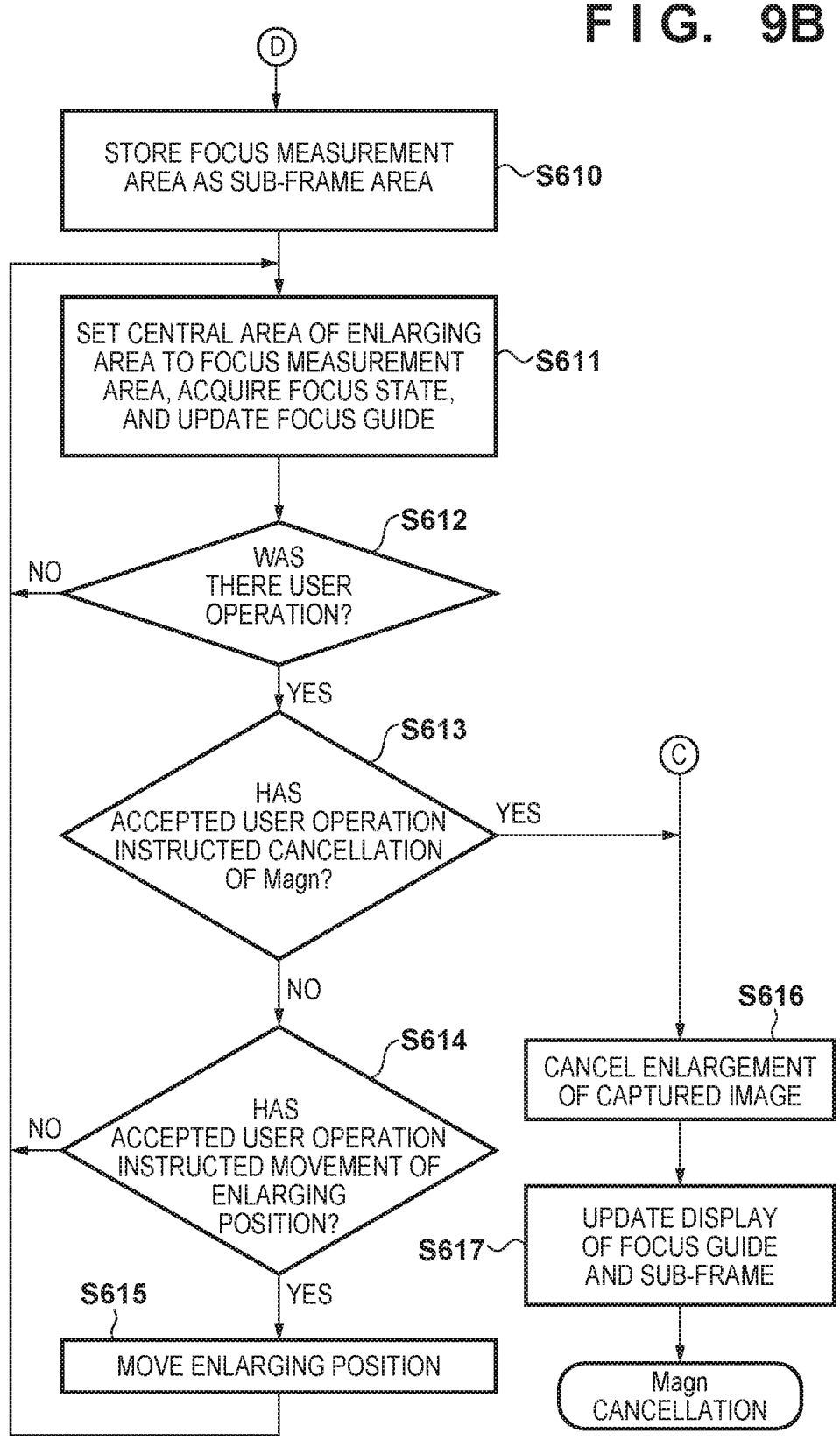

FIGS. 9A and 9B are flowcharts showing control when the "captured image enlarged display" function is enabled and the digital camera 10 is operated at the time that the "focus guide" function is in an enabled state in the second embodiment. The flowcharts of FIGS. 9A and 9B are realized, by the CPU 119a reading out a computer program from the ROM 119b and then extracting and executing the program in the RAM 119c. This flowchart is started by the "captured image enlarged display" function being enabled at the time that the "focus guide" function is in an enabled state, when the operation mode is the shooting mode. Basically, the processing is similar to FIGS. 6A and 6B, with the processing of steps S901 and S902 differing.

In step S901, the CPU 119a stores the number of times of the operation instructing moving of the enlarging position determined in step S607 in the RAM 119c. In step S902, the CPU 119a then determines whether the number of times of the operation exceeds a predetermined amount. If it is determined that the number of times of the operation exceeds a predetermined number of times, the processing advances to step S610, and if it is determined that the number of times of the operation does not exceed the predetermined number of times, the processing returns to step S604.

As described above, in the second embodiment, whether or not to move the position of the focus guide frame to the center of the enlarged image (whether or not to display a new focus guide in the center of the enlarged image) is determined by whether or not the operation for moving the enlarging position exceeds a predetermined number of times. This assumes that, given that the user has input the enlarging position move operation a plurality of times, the user is checking a different focus state from the position where the focus guide frame is positioned. Note that, in the second embodiment, it is determined whether the enlarging position move operation exceeds a predetermined number of times, but whether or not to move the position of the focus guide frame may be determined by the amount of movement from a position after the "captured image enlarged display" function is enabled, rather than by a predetermined number of times. That is, a configuration may be adopted in which, in the case where the amount of movement of the enlarging area according to the moving instruction exceeds a predetermined amount, the focus guide is moved to the center of the enlarged image (a new focus guide is displayed in the center of the enlarged image). Furthermore, in the first and second embodiments (step S611), the central area of enlarged display is set as the focus measurement area, and the focus guide frame is displayed in that area, but the present invention is not limited thereto. For example, any position designated by the user may be used, in which case, the user is able to designate that position in advance on a menu or the like, for example. Also, a fixed position other than the center of the screen may be used, such as the lower center of the screen.

Note that the various types of control described above as being performed by a microcomputer 119 (the CPU 119a) of the digital camera 10 may be performed by one piece of hardware, or overall control of the apparatus may be performed by multiple pieces of hardware (e.g., a plurality of processors and circuits) sharing the processing.

Also, although the present invention has been described in detail based on preferred embodiments thereof, the invention is not limited to these specific embodiments, and various modes in a range that does not depart from the spirit of the invention are also encompassed therein. Furthermore, the aforementioned embodiments are merely illustrative of the invention, and it is also possible to combine the embodiments as appropriate.

Also, in the aforementioned embodiments, the case where the present invention is applied to a digital camera was described as an example, but the present invention is not limited to this example, and is applicable to any device having image capture means and a function of performing live view display of images captured by the image capture means. That is, the present invention is applicable to a personal computer, a PDA, a mobile phone terminal, a portable image viewer, a game machine or the like incorporating or connected to a camera.

Also, the present invention is not limited to an image capture apparatus itself, and is also applicable to a control apparatus that communicates with an image capture apparatus (including a network camera) via cable or wireless communication, and controls the image capture apparatus remotely. Apparatuses that control an image capture apparatus remotely include a smart phone, a tablet PC and a desktop PC, for example. An image capture apparatus can be controlled remotely by notifying commands for causing the image capture apparatus to perform various operations and settings from the control apparatus side, based on operations performed on the control apparatus side and processing performed on the control apparatus side. Also, a configuration may be adopted in which live view images captured with an image capture apparatus are received via cable or wireless communication to enable display on the control apparatus side.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-238917, filed Dec. 13, 2017 which is hereby incorporated by reference herein in its entirety,

What is claimed is:

1. A display control apparatus comprising:
a memory; and
at least one processor and/or at least one circuit to perform the operations of the following units:
an enlargement unit configured to generate an enlarged image obtained by enlarging an image of an enlarging area of a captured image;
a moving unit configured to move the enlarging area according to a moving instruction from a user; and
a control unit configured to display the enlarged image generated by the enlargement unit on a display unit,
wherein the control unit executes:
first display processing for displaying, on the display unit, a first enlarged image of a first enlarging area that includes a first focus measurement area, and a first focus guide that corresponds to the first focus measurement area,
second display processing for, in response to the moving instruction and if the moving instruction does not satisfy a predetermined condition, displaying, on the display unit, a second enlarged image of a second enlarging area whose position was changed from the first enlarging area by the moving instruction and the first focus guide that corresponds to the first focus measurement area, and
third display processing for, in response to the moving instruction and if the moving instruction satisfies the predetermined condition, newly setting a second focus measurement area in a predetermined area of a third enlarging area whose position was changed from the first enlarging area by the moving instruction, and displaying, on the display unit, a third enlarged image of the third enlarging area and a second focus guide that corresponds to the second focus measurement area.

2. The apparatus according to claim 1,
wherein each of the first and second focus guides includes display of a corresponding frame indicating a respective one of the first and second focus measurement areas.

3. The apparatus according to claim 1,
wherein the control unit changes a display form of a particular one of the first and second focus guides based on a focus state of one of the first and second focus measurement areas to which the particular one of the first and second focus guides corresponds.

4. The apparatus according to claim 1,
wherein the predetermined condition is that the entire first focus measurement area leaves an enlarging area whose position was changed from the first enlarging area by the moving instruction.

5. The apparatus according to claim 1,
wherein the predetermined condition is that an area of the first focus measurement area exceeding a predetermined percentage leaves an enlarging area whose position was changed from the first enlarging area by the moving instruction.

6. The apparatus according to claim 1,
wherein the moving instruction is an instruction for moving an enlarging area by a predetermined amount, and
the predetermined condition is a number of times the moving instruction exceeds a predetermined number of times.

7. The apparatus according to claim 1,
wherein the predetermined condition is that a movement amount of an enlarging area from the first enlarging area according to the moving instruction exceeds a predetermined amount.

8. The apparatus according to claim 1,
wherein the predetermined condition is that the first focus measurement area leaves a specific area inside an enlarging area whose position was changed from the first enlarging area by the moving instruction.

9. The apparatus according to claim 1,
wherein the predetermined area of the third enlarging area is a central area of the third enlarging area.

10. The apparatus according to claim 1,
wherein the predetermined area of the third enlarging area is an area that the user is allowed to designate in advance.

11. The apparatus according to claim 1,
wherein the first display processing involves displaying, on the display unit, the first enlarged image obtained by enlarging the image of the first enlarging area, of the captured image, centering on the first focus measurement area.

12. The apparatus according to claim 1,
wherein the control unit sets the second focus measurement area, and thereafter stores the first focus measurement area in a memory unit as a sub-frame area.

13. The apparatus according to claim 12,
wherein the control unit changes display of the first focus guide corresponding to the first focus measurement area to display a sub-frame, in a case where at least part of the first focus measurement area is located within the third enlarging area when the second focus measurement area is set.

14. The apparatus according to claim 1,
wherein the control unit includes a switching unit configured to switch the first focus guide of the first focus measurement area to the second focus guide of the second focus measurement area, and
the control unit, in response to switching by the switching unit, changes the enlarging area from the first enlarging area to the third enlarging area.

15. The apparatus according to claim 1,
wherein the control unit changes a display form of a particular one of the first and second focus guides based on a degree of focus of one of the first and second focus measurement areas to which the particular one of the first and second focus guides corresponds.

16. The apparatus according to claim 1,
wherein the control unit changes a display form of a particular one of the first and second focus guides based on a defocus amount acquired in relation to a particular one of the first and second focus measurement areas to which the particular one of the first and second focus guides corresponds.

17. A control method for a display control apparatus, comprising:
displaying, on a display unit, a first enlarged image of a first enlarging area in a captured image that includes a first focus measurement area, and a first focus guide that corresponds to the first focus measurement area;
moving the first enlarging area in the captured image, in response to a moving instruction from a user that does not satisfy a predetermined condition, and displaying, on the display unit, a second enlarged image of a second enlarging area whose position was changed from the first enlarging area by the moving instruction and the first focus guide that corresponds to the first focus measurement area; and
newly setting, in response to a moving instruction from the user that satisfies the predetermined condition, a second focus measurement area in a predetermined area of a third enlarging area whose position was changed from the first enlarging area by the moving instruction, and displaying, on the display unit, a third enlarged image of the third enlarging area and a second focus guide that corresponds to the second focus measurement area.

18. A non-transitory computer-readable storage medium storing a computer program for causing a computer to execute a control method for a display control apparatus, the control method comprising:
displaying, on a display unit, a first enlarged image of a first enlarging area in a captured image that includes a first focus measurement area, and a first focus guide that corresponds to the first focus measurement area;
moving the first enlarging area in the captured image, in response to a moving instruction from a user that does not satisfy a predetermined condition, and displaying, on the display unit, a second enlarged image of a second enlarging area whose position was changed from the first enlarging area by the moving instruction, and the first focus guide that corresponds to the first focus measurement area; and
newly setting, in response to a moving instruction from the user that satisfies the predetermined condition, a second focus measurement area in a predetermined area of a third enlarging area whose position was changed from the first enlarging area by the moving instruction, and displaying, on the display unit, a third enlarged image of the third enlarging area and a second focus guide that corresponds to the second focus measurement area.

* * * * *